United States Patent
Wang et al.

(10) Patent No.: US 10,616,542 B2
(45) Date of Patent: Apr. 7, 2020

(54) MULTI-DIMENSIONAL IMAGE PROJECTION APPARATUS AND MULTI-DIMENSIONAL IMAGE CALIBRATION METHOD THEREOF

(71) Applicant: Terawins, Inc., Zhonghe, Taipei County (TW)

(72) Inventors: Yu Kuang Wang, Zhonghe (TW); Wen Yi Huang, Zhonghe (TW); Pei Kai Hsu, Zhonghe (TW); Wei Ya Wu, Zhonghe (TW)

(73) Assignee: Terawins, Inc., New Taipei (TW)

( * ) Notice: Subject to any disclaimer, the term of this patent is extended or adjusted under 35 U.S.C. 154(b) by 0 days.

(21) Appl. No.: 15/894,800

(22) Filed: Feb. 12, 2018

(65) Prior Publication Data

US 2019/0124308 A1 Apr. 25, 2019

(30) Foreign Application Priority Data

Oct. 25, 2017 (TW) .............................. 106136696 A (51) Int. Cl.
*H04N 9/31* (2006.01)
*G06T 3/00* (2006.01)

(52) U.S. Cl.
CPC ......... *H04N 9/3185* (2013.01); *G06T 3/0093* (2013.01); *H04N 9/317* (2013.01);
(Continued)

(58) Field of Classification Search
CPC .. H04N 9/3185; H04N 9/3188; G06T 3/0093; G06T 3/0018; G06T 5/0006; G06T 5/50; G06T 7/80
(Continued)

(56) References Cited

U.S. PATENT DOCUMENTS

| | | | |
|---|---|---|---|
| 2004/0169724 A1* | 9/2004 | Ekpar | G06T 3/0062 348/36 |
| 2008/0095468 A1* | 4/2008 | Klemmer | H04N 9/3147 382/285 |

(Continued)

FOREIGN PATENT DOCUMENTS

| | | |
|---|---|---|
| CN | 104813654 A | 7/2015 |
| CN | 103402052 B | 12/2016 |

(Continued)

*Primary Examiner* — Paulos M Natnael
*Assistant Examiner* — Sean N. Haiem
(74) *Attorney, Agent, or Firm* — Muncy, Geissler, Olds & Lowe, P.C.

(57) ABSTRACT

A multi-dimensional image projection apparatus is provided. The multi-dimensional image projection apparatus includes an image projector and an image-processing circuit. The image-processing circuit is configured to receive an input image, and perform a linearity transformation process and a first inverse image warping process on the input image according to sensor information about the multi-dimensional image projection apparatus relative to the projection surface to generate a first image. The image-processing circuit performs a matrix transformation process and a second inverse image warping process on the first image according to the sensor information to generate a second image, and generate an output image according to the second image. The image projector projects the output image onto the projection surface.

9 Claims, 4 Drawing Sheets

(52) U.S. Cl.
CPC ......... *H04N 9/3182* (2013.01); *H04N 9/3188* (2013.01); *H04N 9/3194* (2013.01)

(58) Field of Classification Search
USPC .......... 348/746, 745, 659, 744, 36; 382/285, 382/106, 203; 345/428
See application file for complete search history.

(56) References Cited

U.S. PATENT DOCUMENTS

| | | | |
|---|---|---|---|
| 2013/0201403 A1* | 8/2013 | Iversen | G06T 3/0093 348/659 |
| 2013/0222386 A1* | 8/2013 | Tannhauser | G06T 11/60 345/428 |
| 2014/0193039 A1* | 7/2014 | Wexler | G01C 11/04 382/106 |
| 2015/0302560 A1* | 10/2015 | Sumiyoshi | G09G 3/001 382/203 |
| 2016/0094820 A1* | 3/2016 | Sharp | H04N 9/3182 348/744 |
| 2018/0033128 A1* | 2/2018 | Sobieranski | G03H 1/0866 |
| 2018/0061021 A1* | 3/2018 | Lin | G06T 5/006 |

FOREIGN PATENT DOCUMENTS

| | | |
|---|---|---|
| TW | 201517963 A | 5/2015 |
| TW | I592020 B | 7/2017 |
| WO | WO 2016/138255 | 9/2016 |

* cited by examiner

MULTI-DIMENSIONAL IMAGE PROJECTION APPARATUS AND MULTI-DIMENSIONAL IMAGE CALIBRATION METHOD THEREOF

CROSS REFERENCE TO RELATED APPLICATIONS

This application claims priority of Taiwan Patent Application No. 106136696, filed on Oct. 25, 2017, the entirety of which is incorporated by reference herein.

BACKGROUND OF THE INVENTION

Field of the Invention

The invention relates to image processing, and, in particular, to a multi-dimensional image projection apparatus and multi-dimensional image calibration thereof.

Description of the Related Art

With recent advances in technology, smart projection apparatuses have become popular. For example, a smart projection apparatus may be a large, standalone projector, a screenless laser TV, a micro projector, or a micro-projection apparatus integrated into a mobile device or a portable device. Since unlike traditional fixed projectors, the aforementioned smart projection apparatuses are often portable, and so it is hard to perform image calibration in advance of using these apparatuses. Thus, the display image projected by the smart projection apparatus may shift, be distorted or rotated, or be too big or too small on the projection surface. Various projection apparatuses on the market cannot effectively solve these image-distortion problems.

Accordingly, there is demand for a multi-dimensional image projection apparatus and a multi-dimensional image calibration method to solve the aforementioned problems.

BRIEF SUMMARY OF THE INVENTION

A detailed description is given in the following embodiments with reference to the accompanying drawings.

In an exemplary embodiment, a multi-dimensional image projection apparatus is provided. The multi-dimensional image projection apparatus includes an image projector and an image-processing circuit. The image-processing circuit is configured to receive an input image, and perform a linearity transformation process and a first inverse image warping process on the input image according to sensor information about the multi-dimensional image projection apparatus relative to a projection surface to generate a first image. The image-processing circuit performs a matrix transformation process and a second inverse image warping process on the first image according to the sensor information to generate a second image, and generate an output image according to the second image. The image projector projects the output image onto the projection surface.

In another exemplary embodiment, a multi-dimensional image calibration method for use in a multi-dimensional image projection apparatus, wherein the multi-dimensional image projection apparatus includes an image projector, the method comprising: receiving an input image; receiving sensor information about the multi-dimensional image projection apparatus relative to a projection surface; performing a linearity transformation process and a first inverse image warping process on the input image according to the sensor information to generate a first image, performing a matrix transformation process and a second inverse image warping process on the first image according to the sensor information to generate a second image; generate an output image according to the second image; and utilizing the image projector to project the output image onto the projection surface.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
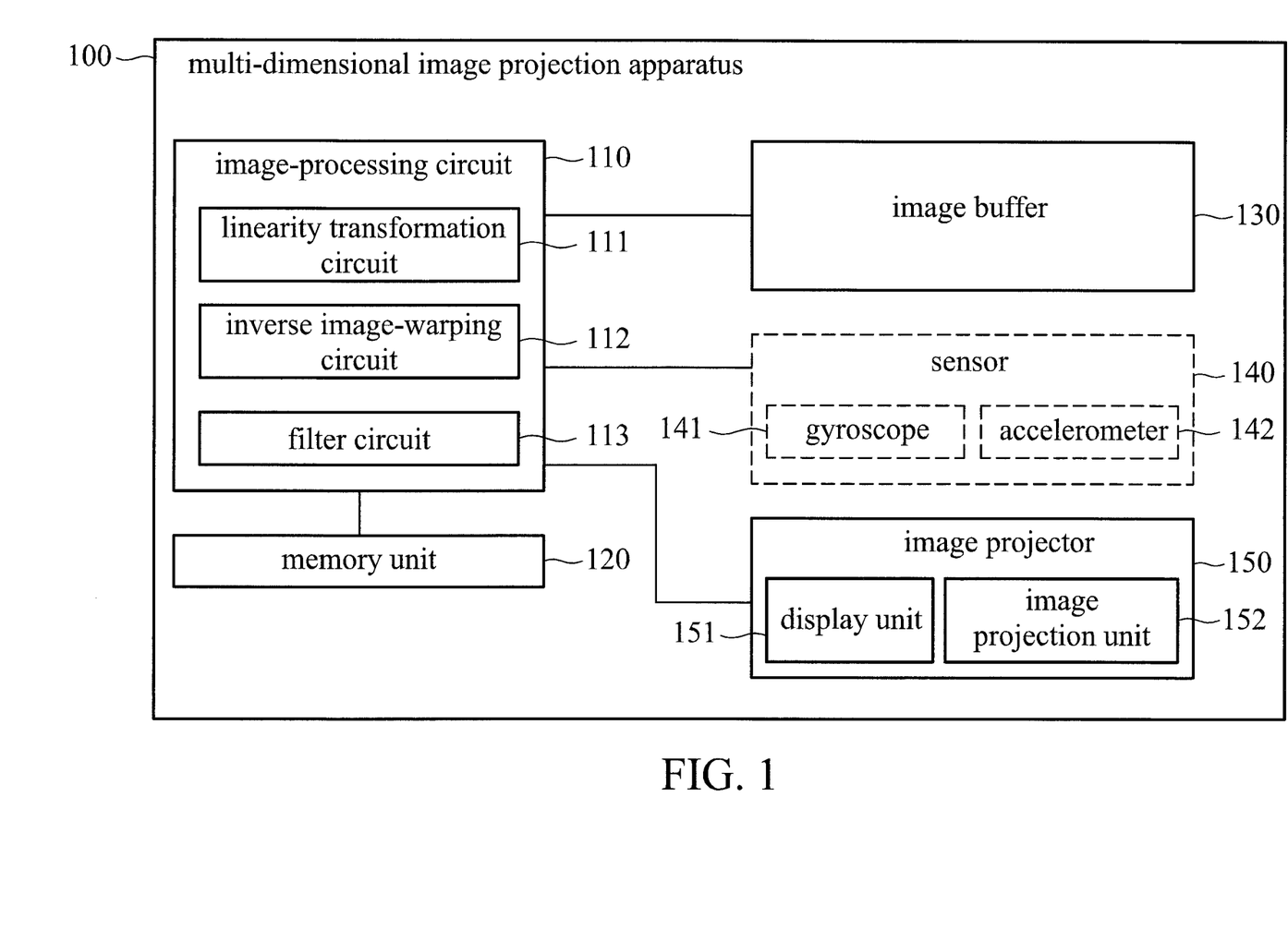
FIG. 1 is a block diagram of a multi-dimensional image projection apparatus in accordance with an embodiment of the invention.

FIG. 1 is a block diagram of a multi-dimensional image projection apparatus in accordance with an embodiment of the invention. For example, the multi-dimensional image projection apparatus 100 may be deployed into a projection display apparatus. The projection display apparatus may be a standalone portable micro-projector. Alternatively, the projection display apparatus may be a portable device or a mobile device such as a smartphone, a tablet PC, a smart wristband, a smart watch, a pair of smart glasses, or a laptop. The projection display apparatus may also be a television apparatus such as a projector or a projection TV such as a cathode ray tube (CRT) projection display, an liquid-crystal projection display, a digital light processing (DLP) projection display, a reflective liquid-crystal on silicon color sequential (LCoS CS) projection display, a reflective liquid-crystal on silicon color filter (LCoS CF) projection display, or a Laser TV. The multi-dimensional image projection apparatus 100 is configured to project an output image to a surface such as a wall or a curtain, but the invention is not limited thereto.

Since a micro-projection apparatus can be carried by the user, it can be hard to perform image calibration in advance of using the apparatus, unlike with traditional fixed projectors. Thus, the display image projected by the smart projection apparatus may shift, distort, rotate, or be too big or small on the projection surface. Various projection apparatuses on the market cannot effectively solve the problem of image distortion. Accordingly, a multi-dimensional image projection apparatus 100 and a multi-dimensional image calibration method are provided in the invention to solve the aforementioned problem.

As illustrated in FIG. 1, the multi-dimensional image projection apparatus 100 includes an image-processing circuit 110, a memory unit 120, an image buffer 130, and an image projector 150.

The image-processing circuit 110 is configured to process an input image or a to-be-projected image to generate an output projection image according to sensor information or environmental information (e.g. obtained from external sensor information or the sensor 140 of the multi-dimensional image projection apparatus 100). For example, the image-processing circuit 110 may be an application-specific integrated circuit (ASIC), a field-programmable gate array (FPGA), or a system-on-chip, but the invention is not limited thereto. It should be noted that various image-processing circuits are collectively regarded as the image-processing circuit 110, and the image-processing circuit 110 may include one or more sub-circuits, and each sub-circuit may be configured to perform respective image processing operations in the image calibration procedure. In some embodiments, the image-processing circuit 110 may be implemented by a central processing circuit (CPU), a digital signal processor (DSP), or an image signal processor (ISP), but the invention is not limited thereto.

The memory unit 120 may be a static random access memory (SRAM), and configured to store temporary image data during the image calibration procedure.

In some embodiments, the multi-dimensional image projection apparatus 100 further includes a sensor 140, wherein the sensor 140 may include a gyroscope 141 and an accelerometer 142 that are configured to obtain sensor information of the multi-dimensional image projection apparatus 100 relative to the projection surface. The sensor information may include information about the rotation angles, tilt angles and directions of the multi-dimensional image projection apparatus 100 on three axes (e.g., X-axis, Y-axis, and Z-axis), and the interior angle between the multi-dimensional image projection apparatus 100 and the projection surface, but the invention is not limited thereto. In some embodiments, the multi-dimensional image projection apparatus 100 may receive external sensor information or environmental information, such as position and angle information about the multi-dimensional image projection apparatus 100 relative to the projection surface, that is measured by an external sensor apparatus.

The image buffer 130 may be a volatile memory such as a dynamic random access memory (DRAM), and configured to store intermediate and temporary image data during the image calibration procedure, and the output image.

The image projector 150 is configured to project the output image to the projection surface. For example, the image projector 150 may be implemented by one of the projection techniques such as Laser scan projection, digital lighting process (DLP) projection, transmissive liquid-crystal projection, LCoS CS projection, and LCoS CF projection, but the invention is not limited thereto. Specifically, the image projector 150 may include a display unit 151 and an image projection unit 152. The image-processing circuit 110 may read the output image processed by the image calibration process from the image buffer 130 and display the output image on the display unit 151 (e.g., an LCD or LED display), and the displayed image on the display unit 151 can be projected onto the projection surface by the image projection unit 152.

In an embodiment, the image-processing circuit 110 may include a linear transformation circuit 111, an inverse image-warping circuit 112, and a filter circuit 113. The linear transformation circuit 111 is configured to perform linearity transformation and a first inverse image-warping process on the input image to generate a first image. The inverse image-warping circuit 112 is configured to perform a matrix conversion process (e.g., including horizontal mapping, vertical mapping, rotation mapping, and scaling) and a second inverse image-warping process on the first image to generate a second image. The filter circuit 113 is configured to perform adaptive sharpness filtering and adaptive intensity balancing on the second image generated by the inverse image-warping circuit 112 to generate an output image.

In an embodiment, the image-processing circuit 110 may receive an input image and store the input image into the image buffer 130. The linearity transformation circuit 111 may read the input image stored in the image buffer 130, and perform a linearity transformation process on the input image. For example, the multi-dimensional image projection apparatus 100 may have a horizontal rotation angle and a vertical rotation angle. If the multi-dimensional image projection apparatus 100 faces toward the left side relative to the projection surface, the left portion of the projected image may be stretched when compared with the right portion of the projected image. In other words, in the embodiment, if it is desired to view a non-distorted image on the projection surface, it is necessary to perform an inverse linearity transformation process on the input image in advance of projecting the output image. For example, the left side of the input image can be shrunk by the inverse linearity transformation process. It should be noted that the horizontal linearity transformation and the vertical linearity transformation can be performed independently.

For example, the horizontal linearity transformation can be expressed by the following equations:

$$X'=\text{cols}*(X/\text{cols})^{(1/val)} \quad (1)$$

$$Y'=Y \quad (2)$$

where X denotes the input image; A denotes the transformation matrix; and X' denotes the horizontally transformed image.

The vertical linearity transformation can be expressed by the following equations:

$$X'=X \quad (3)$$

$$Y'=\text{rows}*(Y/\text{rows})^{(1/val)} \quad (4)$$

where Y denotes the input image; A denotes the transformation matrix; and Y' denotes the horizontally transformed image. In equations (1) and (4), cols and rows denote the number of columns and rows in the image, respectively; val denotes a calibration parameter of the linearity transformation. One having ordinary skill in the art will appreciate the techniques of linearity transformation, and thus the details will be omitted here. When the linearity transformation circuit 111 has performed the horizontal linearity transformation and the vertical linearity transformation, a linearly transformed image is obtained. The linearity transformation circuit 111 may perform an image inverse-warping process on the linearly transformed image to generate a first image, and store the first image into the image buffer 130.

It should be noted that the first image is obtained after the linearity transformation circuit 111 has performed the linearity transformation process and the inverse image warping process on the two-dimensional input image, where the first image may be an image with a distorted shape. Accordingly, pixels in the first image and those of the input image do not have one-to-one correspondence. Specifically, the positions of the pixels in the first image are expressed with different integer coordinates, and that is, each pixel on integer coordinates of the first image has been processed by the inverse image warping process to correspond to the position in the input image. It should be noted that the position in the input image corresponding to each pixel of each pixel in the first image may be not on integer coordinates and may be located between multiple pixels on different integer coordinates. Thus, the pixels of the first image that correspond to non-integer coordinates of the input image can be calculated using linear interpolation, wherein the linear interpolation may be implemented by nearest neighboring pixel, bi-linear interpolation, bi-cubic interpolation, or a sinc function, but the invention is not limited thereto.

In an embodiment, the inverse image-warping circuit 112 may calculate a linear transformation matrix RVS_matrix according to the sensor information from the sensor 140. For example, the linear transformation matrix RVS_matrix can be calculated by the following equation:

$$RVS\_matrix = R\_matrix * V\_matrix * H\_matrix \quad (5)$$

where R_matrix denotes a rotation transformation matrix; V_matrix denotes a vertical transformation matrix; and H_matrix denotes a horizontal transformation matrix. In an embodiment, the rotation transformation matrix R_matrix, the vertical transformation matrix V_matrix, and the horizontal transformation matrix H_matrix can be expressed with a respective fixed transformation matrix expressed below:

$$R\_matrix = \begin{bmatrix} 0.866 & 0.5 & -54.9 \\ -0.5 & 0.866 & 95.09 \\ 0 & 0 & 1 \end{bmatrix} \quad (6)$$

$$V\_matrix = \begin{bmatrix} 1 & 0.181 & 0 \\ 0 & 1.363 & 0 \\ 0 & 0.001 & 1 \end{bmatrix} \quad (7)$$

$$H\_matrix = \begin{bmatrix} 0.666 & 0 & -0 \\ -0.166 & 0.666 & 50 \\ -0.001 & 0 & 1 \end{bmatrix} \quad (8)$$

It should be noted that the aforementioned rotation transformation matrix R_matrix, the vertical transformation matrix V_matrix, and the horizontal transformation matrix H_matrix are examples of standard correction matrices for purposes of description, and the invention is not limited to the aforementioned transformation matrices. Specifically, there is a corresponding standard correction matrix for a specific horizontal rotation angle, vertical rotation angle (tilt angle), and rotation angle (i.e., relative to the Z-axis) of the multi-dimensional image projection apparatus 100, and different configurations of the rotation transformation matrix R_matrix, the vertical transformation matrix V_matrix, and the horizontal transformation matrix H_matrix can be stored in a matrix look-up table stored in the memory unit 120. Briefly, the inverse image-warping circuit 112 may retrieve the corresponding rotation transformation matrix R_matrix, vertical transformation matrix V_matrix, and horizontal transformation matrix H_matrix according to the sensor information from the sensor 140, thereby calculating the linearity transformation matrix RVS_matrix.

Given that the resolutions of the input image and the image projector 150 are 1920×1080, when the linearity transformation matrix is calculated, the transformed image may exceed the range of the resolution of the image projector 150, and thus the transformed image should be resized to fit the resolution of the image projector 150. For example, the inverse image-warping circuit 112 may calculate the current angle of the multi-dimensional image projection apparatus 100 and the matrix required for shifting using linear interpolation. Then, the inverse image-warping circuit 112 may multiply a scaling transformation matrix S_matrix with the linearity transformation matrix RVS_matrix to obtain a target matrix M. The target matrix M can be expressed by the following equation:

$$M = S\_matrix * R\_matrix * V\_matrix * H\_matrix \quad (9)$$

The scaling transformation matrix S_matrix is also stored in the matrix look-up table of the memory unit 120. For example, the scaling transformation matrix S_matrix can be expressed by a fixed transformation matrix s_matrix that can be expressed by the following equation:

$$s\_matrix = \begin{bmatrix} 0.923 & 0 & 21.24 \\ 0 & 0.923 & 27.58 \\ 0 & 0 & 1 \end{bmatrix} \quad (10)$$

Specifically, the inverse image-warping circuit 112 may read the first image stored in the image buffer 130, and perform a matrix transformation process (e.g. multiplying the first image with the target matrix M) on the first image to obtain a calibrated image. Then, the inverse image-warping circuit 112 may perform image inverse warping on the calibrated image to obtain a second image.

It should be noted that the second image is obtained by performing the aforementioned linearity transformation process and scaling transformation process on the two-dimensional first image followed by the image inverse warping process, where the second image may be a shape-distorted image. Accordingly, the pixels in the second image and those in the first image do not have one-to-one correspondence. Specifically, the coordinates of the pixels in the calibrated image are expressed by integers, and thus each pixel of the second image on the integer coordinates has been processed by the inverse image warping to correspond to the position in the first image. It should be noted that the position in the first image corresponding to each pixel in the second image having integer coordinates may be not integer coordinates. Thus, a linear interpolation technique can be used to calculate the pixel of the second image that are mapped to non-integer coordinates in the first image, where the linear interpolation technique may be the nearest integer, bi-linear interpolation, bi-cubic interpolation, or a sine function, but the invention is not limited thereto.

Figure 2A:
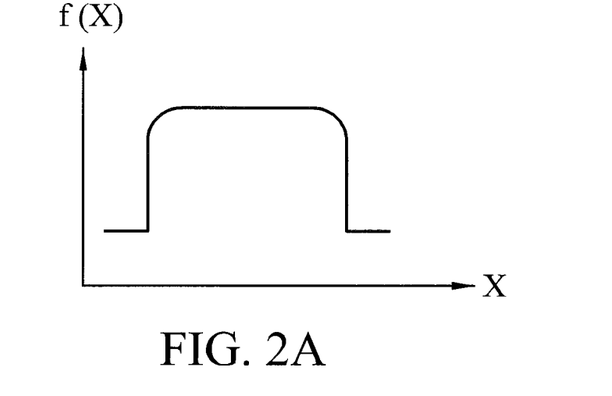
FIGS. 2A-2C are diagrams of a one-dimensional Laplace transform performed by the filter circuit in accordance with an embodiment of the invention.
Figure 2B:
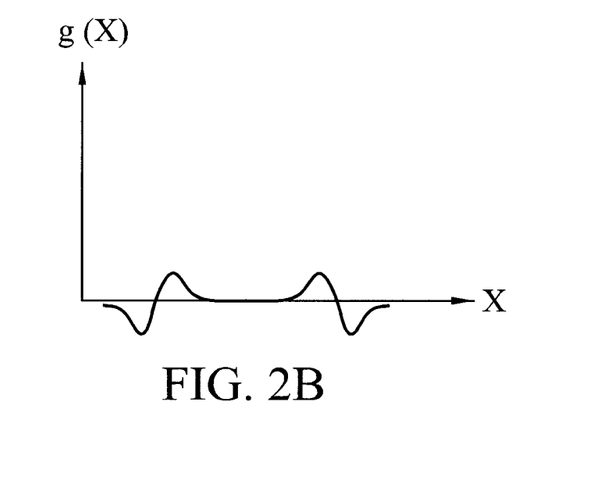
Figure 2C:
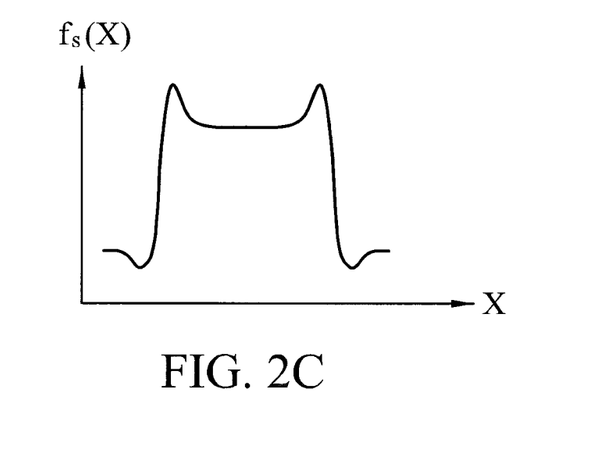

FIGS. 2A~2C are diagrams of a one-dimensional Laplace transform performed by the filter circuit in accordance with an embodiment of the invention. For example, when the image projector 150 projects an image onto the projection surface in common conditions, the center of the projected image may be clearly focused, but the top portion and the edges of the projected image may be not clearly focused, resulting in blur on the edges rather than the center of the projected image. In an embodiment, the filter circuit 113 may enhance the sharpness of the edges of the second images to generate an output image, and, that is, the filter circuit 113 includes a sharpness filter. In addition, the filter circuit 113 further includes an intensity balancing filter for correcting the problem of unbalanced intensity values of the projected image projected by the multi-dimensional projection apparatus 100 on the projection surface.

Specifically, taking the sharpness filter as an example, the filter circuit 113 may obtain the projection angle of the image projector 150 according to the sensor information from the sensor 140, and calibrate parameters of the sharpness filter. In an embodiment, the filter circuit 113 may perform a two-dimensional Laplace transform on the second image, and the calculation of the two-dimensional Laplace transform can be expressed by the following equation:

$$\Delta f = \frac{\partial^2 f}{\partial x^2} + \frac{\partial^2 f}{\partial y^2} \qquad (11)$$

For example, the original function f(x) of the second image can be expressed by FIG. 2A which is a relationship diagram between the function f(x) and the variable x. After performing the one-dimensional Laplace transform, the edge characteristics can be obtained by the following equation:

$$g(x)=f(x)*h_h(x) \qquad (12)$$

where the diagram of the function g(x) can be expressed by FIG. 2B, and the edge characteristics are obtained.

Then, the filter circuit 113 may multiply the function g(x) in FIG. 2B by a weighting factor, and add the multiplication result back to the original function f(x). The aforementioned calculation can be expressed by the following equation:

$$f_s(x)=f(x)+\alpha \cdot g(x) \qquad (13)$$

where the diagram of the function fs(x) can be expressed by FIG. 2C. Referring to FIG. 2C, it is clear that the edge characteristics of the original second image have been added back to the second image. It should be noted that, for purposes of description, the one-dimensional Laplace transform in the horizontal direction (X-axis) is used in the aforementioned embodiment, and the filter circuit 113 may perform a similar one-dimensional Laplace transform on the second image along the vertical direction (Y-axis), thereby obtaining the output image.

Accordingly, the output image has a better sharpness on the edges when compared with the second image, and the user may view output images with a better image quality after the image projector 150 projects the output image onto the projection surface.

In some embodiments, the filter circuit 113 can be omitted, and, that is, the image projector 150 may directly project the second onto the projection surface.

Taking the intensity balancing filter as an example, the filter circuit 113 may correct the problem of unbalanced intensity values of the projected image projected by the multi-dimensional projection apparatus 100 on the projection surface. For example, based on the illumination-distance formula, the illumination (or intensity) from a point light source is inversely proportional to the square of the distance from the point light source. For a conventional image projector, it may have a fixed position since the position and projection parameters can be well calibrated in advance, and thus the unbalanced intensity issue of the projected image of the conventional image projector may be not obvious. However, for a portable image projection apparatus, especially for a short-focal-length projector, the user may easily perceive the unbalanced intensity issue of the projected image. Because the distance between the light source and the projection surface is very short and the projection angle is large, the distance between the center and the edges of the projected image projected by the short-focal-length projector on the projection surface may be much larger than that of the projected image by the conventional image projector. Accordingly, the difference of the intensities between the center and the edges of the projected image may also become larger for the short-focal-length projector.

Figure 4A:
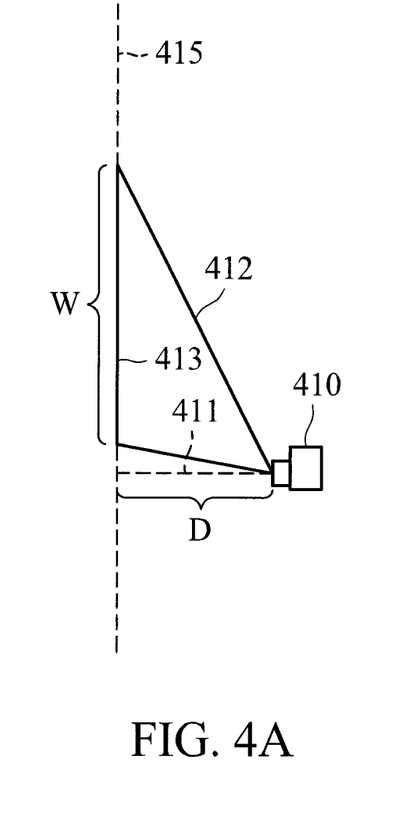
FIGS. 4A and 4B are diagrams of projected images projected by image projectors with different throw ratios.
Figure 4B:
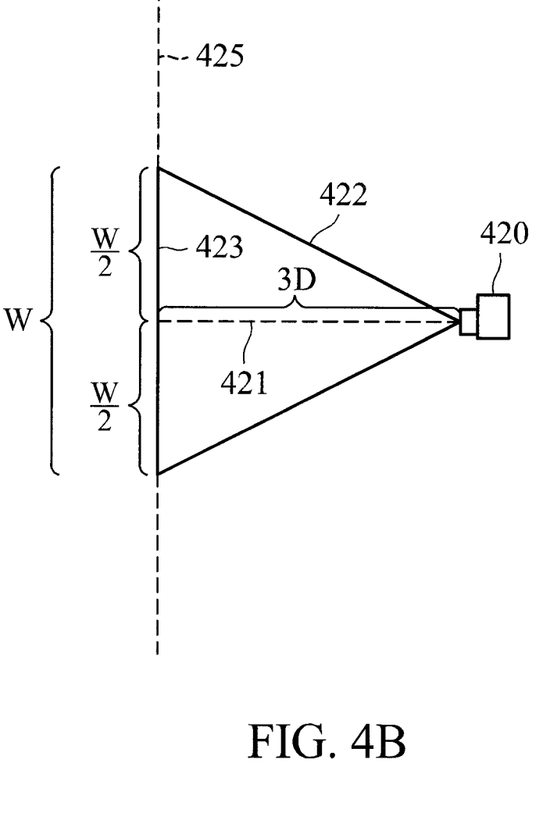

FIGS. 4A and 4B are diagrams of projected images projected by image projectors with different throw ratios. For example, the short-focal-length projector 410 may be the multi-dimensional image projection apparatus 100 in FIG. 1, and have a throw ratio TR1 of 0.5. The common image projector 420 may have a throw ratio TR2 of 1.5.

Referring to FIG. 4A, the short-focal-length projector 410 projects images onto the projection surface 415 with an elevation angle (e.g. from 45 to 65 degrees, or can be adjusted according to practical conditions). If the projected image projected on the projection surface 415 has a width of W and the vertical projection distance 411 is D in FIG. 4A, the intensity ratio R1 between the direct light region having the largest intensity and the inclined light region having the least intensity (i.e. the two farthest terminals of the hypotenuse 412) can be expressed by the equation: $R1=(W^2+D^2)/D^2$. If the throw ratio TR1 of the short-focal-length projector 410 is used, the intensity ratio R1 is equal to 5. It should be noted that, for purposes of description, the short-focal-length projector 410 in FIG. 4A may be a short-focal-length reflective projector, and thus the output image can be projected onto the projection surface 415 as shown in FIG. 4A, but the multi-dimensional image projection apparatus 100 in the invention is not limited to the short-focal-length projector in FIG. 4A.

In FIG. 4B, if the projected image on the projection surface 425 has a width of W, the vertical projection distance (i.e. the vertical distance between the image projector 420 and the projection surface 425) of the common image projector 420 should be set to 3D because it has a throw ratio TR2=(3D/W)=1.5. Similarly, if the projected image on the projection surface 425 has a width 423 of 2 W and the vertical projection distance 421 is 3D, the intensity ratio R2 between the direct light region having the largest intensity and the inclined light region having the least intensity (i.e. the two farthest terminals of the hypotenuse 422) can be expressed by the equation: $R2=(W^2/4+9D^2)/9D^2$. If the throw ratio TR2 of the common image projector 420 is used, the intensity ratio R2 is equal to 1.11.

In the examples of FIG. 4A and FIG. 4B, it is understood that the intensity ratio between the direct light region having the largest intensity and the inclined light region having the least intensity of the short-focal-length projector 410 is several multiples of that of the common image projector 420. In order to balance the intensity values of the projected output image, the brightness balancing filter of the filter circuit 113 may adjust the intensity value of each pixel in the output image, such as adjusting intensity values of the red, blue, and green sub-pixels of a specific pixel in different projection distances, with the following equations:

$$\text{pixel}_R = \alpha \times (\text{pixel}_R + \text{mean}_R \times (\tan \theta)^2) \qquad (14)$$

$$\text{pixel}_G = \alpha \times (\text{pixel}_G + \text{mean}_G \times (\tan \theta)^2) \qquad (15)$$

$$\text{pixel}_B = \alpha \times (\text{pixel}_B + \text{mean}_B \times (\tan \theta)^2) \qquad (16)$$

where θ denotes the inner angle between the hypotenuse 412 and the vertical projection distance 411 between the multi-dimensional image projection apparatus 100 and the projection surface 415, as illustrated in FIG. 4A; a denotes a calibration parameter for use in equations (14), (15), and (16); $\text{pixel}_R$, $\text{pixel}_B$, and $\text{pixel}_G$ respectively denote the intensity values of the red, blue, and green sub-pixels of the specific pixel to be adjusted in the output image; $\text{mean}_R$, $\text{mean}_B$, and $\text{mean}_G$ respectively denote the average values of the red, blue, and green sub-pixels in the output image.

Specifically, if the distance between the specific pixel and the center of the projected image is longer, the inner angle θ is larger, and thus the value of tan θ is also larger. It indicates that more intensity values should be compensated on the red, blue, and green sub-pixels, so that the user may not perceive the intensity unbalancing issue on the projected image projected by the multi-dimensional image projection apparatus 100 on the projection plane, thereby improving the user's experience.

Figure 3:
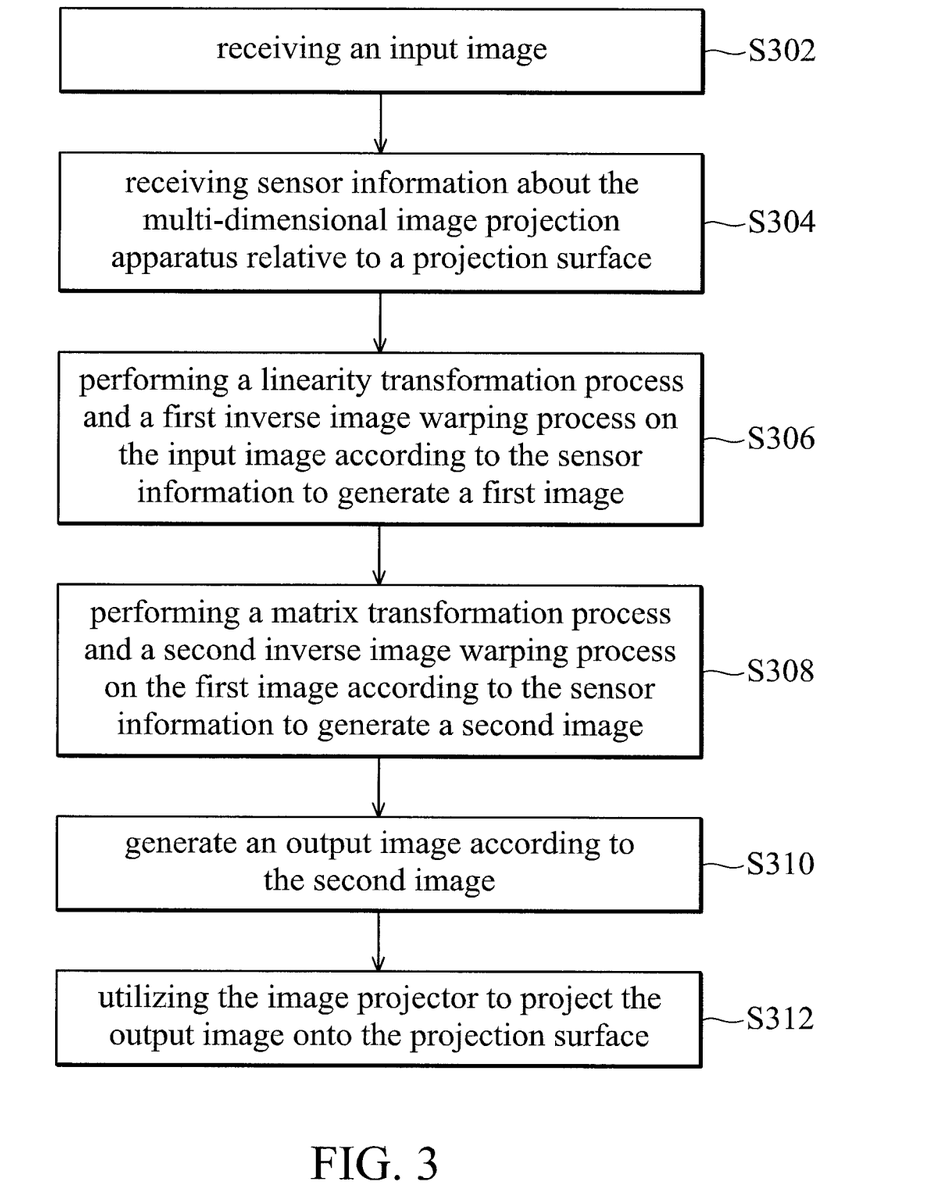
FIG. 3 is a flow chart of a multi-dimensional image calibration method in accordance with an embodiment of the invention.

FIG. 3 is a flow chart of a multi-dimensional image calibration method in accordance with an embodiment of the invention.

In step S302, the image-processing circuit 110 receives an input image. For example, the input image may be a two-dimensional image that can be received from an external apparatus or read from the memory unit 120 of the multi-dimensional image projection apparatus 100.

In step S304, sensor information of the multi-dimensional image projection apparatus relative to the projection surface is received. For example, the sensor information may be from the sensor 140 of the multi-dimensional image projection apparatus 100, or from an external sensor.

In step S306, the image-processing circuit 110 performs a linearity transformation process and a first image inverse warping process on the input image to generate a first image. For example, the linearity transformation circuit 111 of the image-processing circuit 110 performs a linearity transformation process on the input image to obtain a linearly transformed image, and the linearity transformation circuit 111 further performs the first inverse image warping process on the linearly transformed image to obtain the first image. It should be noted that, the reference image of the first inverse image warping process is the input image.

In step S308, the image-processing circuit 110 performs a matrix transformation process and a second inverse image warping process on the first image according to the sensor information to generate a second image. For example, the inverse image-warping circuit 112 of the image-processing circuit 110 performs the matrix transformation process on the first image to obtain a calibrated image, and the inverse image-warping circuit 112 further performs the second inverse image warping process on the calibrated image to obtain the second image. It should be noted that the reference image of the second inverse image warping process is the first image.

In step S310, an output image is generated according to the second image. For example, the image-processing circuit 110 may apply a sharpness filter on the second image to obtain the output image. In an example, the filter circuit 113 may implement the sharpness filter using the two-dimensional Laplace filter, thereby enhancing the sharpness of the edges of the output image. In some embodiments, step S306 can be omitted, and, that is, the image-processing circuit 110 may use the second image as the output image.

In step S312, the image projector 150 is used to project the output image onto the projection surface.

In view of the above, a multi-dimensional image projection apparatus and a multi-dimensional image calibration method thereof are provided in the invention. The multi-dimensional image projection apparatus and the multi-dimensional image calibration method are capable of performing multi-dimensional image transformations such as image transformation in the basic three-dimensional space (e.g., horizontal/vertical transformation, rotation transformation, and scaling transformation along the X-axis, Y-axis, and Z-axis), linearity transformation (e.g. the fourth dimension), sharpness filtering (e.g. the fifth dimension), and adaptive intensity balancing (e.g. the sixth dimension). It should be noted that the invention is not limited to the image transformations in the aforementioned dimensions.

Additionally, since the projection angle, rotation angle, and position of the image projector 150 may vary, different image effects may be viewed on the projection surface. The multi-dimensional image projection apparatus and the multi-dimensional image calibration method may perform the image calibration process on the input image according to the sensor information. After the output image has been projected by the image projector 150 onto the projection surface, the user may view an un-distorted image on the projection surface. That is, the multi-dimensional image projection apparatus in the invention can be placed freely, and may automatically perform image calibration on the input image. In addition, the multi-dimensional image projection apparatus in the invention may also enhance the sharpness of the image edges and balance the intensity values of the output image, thereby improving the user's experience.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine, such as a computer, the machine thereby becomes an apparatus for practicing the methods. The methods may also be embodied in the form of a program code transmitted over some transmission medium, such as an electrical wire or a cable, or through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A multi-dimensional image projection apparatus, comprising:

an inertial sensor, configured to detect inertial-sensor information about the multi-dimensional image projection apparatus relative to a projection surface;

an image projector; and an image-processing circuit, configured to receive an input image, and perform a linearity transformation process and a first inverse image warping process on the input image according to the inertial-sensor information detected by the inertial sensor, wherein the image-processing circuit performs a matrix transformation process and a second inverse image warping process on the first image according to the sensor information to generate a second image, and generates an output image according to the second image, wherein the image projector projects the output image onto the projection surface, wherein the image-processing circuit applies a sharpness filter on the second image to generate a third image, and applies an intensity balancing filter on the third image to generate the output image, and wherein the intensity balancing filter is expressed as:

$$pixel_R = \alpha \times (pixel_R + mean_R \times (\tan \theta)^2);$$

$$pixel_G = \alpha \times (pixel_G + mean_G \times (\tan \theta)^2);$$

$$pixel_B = \alpha \times (pixel_B + mean_B \times (\tan \theta)^2);$$

where θ denotes the inner angle between a hypotenuse and a vertical projection distance between the multi-dimensional image projection apparatus and the projection surface; α denotes a calibration parameter; $pixel_R$, $pixel_B$, and $pixel_G$ respectively denote the intensity values of the red, blue, and green sub-pixels of a specific pixel to be adjusted in the third image; $mean_R$, $mean_B$, and $mean_G$ respectively denote the average values of the red, blue, and green sub-pixels in the third image.

2. The multi-dimensional image projection apparatus as claimed in claim 1, wherein the image-processing circuit performs the linearity transformation process on the input image to generate a linearly transformed image, and the image-processing circuit performs the first inverse image warping process on the linearly transformed image to generate the first image, and wherein a reference image of the first inverse image warping process is the input image.

3. The multi-dimensional image projection apparatus as claimed in claim 1, wherein the image-processing circuit performs the matrix transformation process on the first image to generate a calibrated image, and the image-processing circuit performs the second inverse image warping process on the calibrated image to generate the second image, and wherein a reference image of the second inverse image warping process is the first image.

4. The multi-dimensional image projection apparatus as claimed in claim 1, wherein the sharpness filter is a two-dimensional Laplace filter.

5. A multi-dimensional image calibration method for use in a multi-dimensional image projection apparatus, wherein the multi-dimensional image projection apparatus includes an inertial sensor and an image projector, the method comprising:

receiving an input image;

detecting, by the inertial sensor, sensor information about the multi-dimensional image projection apparatus relative to a projection surface;

performing a linearity transformation process and a first inverse image warping process on the input image according to the sensor information detected by the inertial sensor to generate a first image;

performing a matrix transformation process and a second inverse image warping process on the first image according to the sensor information to generate a second image;

generating an output image according to the second image; and utilizing the image projector to project the output image onto the projection surface, wherein the step of generating the output image according to the second image comprises:

applying a sharpness filter on the second image to generate a third image; and applying an intensity balancing filter on the third image to generate the output image, wherein the intensity balancing filter is expressed as:

$$pixel_R = \alpha \times (pixel_R + mean_R \times (\tan \theta)^2);$$

$$pixel_G = \alpha \times (pixel_G + mean_G \times (\tan \theta)^2);$$

$$pixel_B = \alpha \times (pixel_B + mean_B \times (\tan \theta)^2);$$

where θ denotes the inner angle between a hypotenuse and a vertical projection distance between the multi-dimensional image projection apparatus and the projection surface; a denotes a calibration parameter; $pixel_R$, $pixel_B$, and $pixel_G$ respectively denote the intensity values of the red, blue, and green sub-pixels of a specific pixel to be adjusted in the third image; $mean_R$, $mean_B$, and $mean_G$ respectively denote the average values of the red, blue, and green sub-pixels in the third image.

6. The multi-dimensional image calibration method as claimed in claim 5, further comprising:

performing the linearity transformation process on the input image to generate a linearly transformed image; and performing the first inverse image warping process on the linearly transformed image to generate the first image, wherein a reference image of the first inverse image warping process is the input image.

7. The multi-dimensional image calibration method as claimed in claim 5, further comprising:

performing the matrix transformation process on the first image to generate a calibrated image; and performing the second inverse image warping process on the calibrated image to generate the second image, wherein a reference image of the second inverse image warping process is the first image.

8. The multi-dimensional image calibration method as claimed in claim 5, wherein the sharpness filter is a two-dimensional Laplace filter.

9. A multi-dimensional image projection apparatus, comprising:

an image projector; and an image-processing circuit, configured to receive an input image, retrieves inertial-sensor information from an external device, and perform a linearity transformation process and a first inverse image warping process on the input image according to the retrieved inertial-sensor information about the multi-dimensional image projection apparatus relative to a projection surface to generate a first image, wherein the image-processing circuit performs a matrix transformation process and a second inverse image warping process on the first image according to the sensor information to generate a second image, and generates an output image according to the second image, wherein the image projector projects the output image onto the projection surface, and wherein the image-processing circuit applies a sharpness filter on the second image to generate a third image, and applies an intensity balancing filter on the third image to generate the output image, wherein the intensity balancing filter is expressed as:

$$pixel_R = \alpha \times (pixel_R + mean_R \times (\tan \theta)^2);$$

$$pixel_G = \alpha \times (pixel_G + mean_G \times (\tan \theta)^2);$$

$$pixel_B = \alpha \times (pixel_B + mean_B \times (\tan \theta)^2);$$

where $\theta$ denotes the inner angle between a hypotenuse and a vertical projection distance between the multi-dimensional image projection apparatus and the projection surface; a denotes a calibration parameter; $pixel_R$, $pixel_B$, and $pixel_G$ respectively denote the intensity values of the red, blue, and green sub-pixels of a specific pixel to be adjusted in the third image; $mean_R$, $mean_B$, and $mean_G$ respectively denote the average values of the red, blue, and green sub-pixels in the third image.

* * * * *